United States Patent
Barton

(10) Patent No.: US 6,979,240 B1
(45) Date of Patent: Dec. 27, 2005

(54) ADJUSTABLE FOOT PEDESTAL FOR A TROLLING MOTOR CONTROLLER

(75) Inventor: Kurt Barton, 21341 Beech Daly, Brownstown, MI (US) 48134

(73) Assignee: Kurt Barton, Brownstown, MI (US)

( * ) Notice: Subject to any disclaimer, the term of this patent is extended or adjusted under 35 U.S.C. 154(b) by 0 days.

(21) Appl. No.: 10/914,355

(22) Filed: Aug. 9, 2004

(51) Int. Cl.$^7$ .............................................. B60L 15/20
(52) U.S. Cl. ..................................... 440/7; 297/423.46
(58) Field of Search ....................... 440/7; 297/423.23, 297/423.24, 423.27, 423.44, 423.46

(56) References Cited

U.S. PATENT DOCUMENTS

| | | |
|---|---|---|
| 330,911 A | 11/1885 | Livingston |
| 344,269 A | 6/1886 | Gregory |
| 821,269 A | 5/1906 | Dozier |
| 1,104,891 A | 7/1914 | Heusser |
| 3,592,423 A | 7/1971 | Mui |
| 3,626,785 A * | 12/1971 | Ross ............................ 74/512 |
| 3,653,715 A * | 4/1972 | Drabert et al. ......... 297/423.45 |
| 3,704,848 A | 12/1972 | Trebes et al. |
| 4,008,500 A | 2/1977 | Hall, Jr. et al. |
| 4,702,713 A | 10/1987 | Lee |
| 4,722,706 A | 2/1988 | Young |
| 4,768,831 A | 9/1988 | Liedberg et al. |
| 4,964,820 A | 10/1990 | Rayborn |
| 5,108,089 A * | 4/1992 | Wilkinson .................... 482/52 |
| 5,346,415 A | 9/1994 | Waymon et al. |
| 5,398,620 A | 3/1995 | Rouch |
| 5,419,618 A * | 5/1995 | Hatcher ................. 297/423.46 |
| 5,584,535 A * | 12/1996 | Jacobson et al. ...... 297/423.46 |
| 5,628,484 A | 5/1997 | Lechuga |
| 5,660,362 A | 8/1997 | Selby et al. |
| 6,079,687 A | 6/2000 | Calleia |
| 6,126,497 A | 10/2000 | Stockton |
| 6,305,447 B1 | 10/2001 | Rousseau |
| 6,321,617 B1 | 11/2001 | Schwyn |
| 6,359,456 B1 | 3/2002 | Hembree et al. |
| 2002/0014573 A1 | 2/2002 | Anderson |

* cited by examiner

*Primary Examiner*—Jesus D. Sotelo
(74) *Attorney, Agent, or Firm*—MacMillan, Sobanski & Todd, LLC

(57) ABSTRACT

A portable foot pedestal is provided for supporting a foot switch trolling motor controller for a boat. The portable foot pedestal includes a substantially planar member having an upper surface and a bottom surface for supporting the foot switch controller. A plurality of adjustable support members is provided for supporting the planar member. The support members include substantially spherical end portions for contacting a bottom surface of the boat. A plurality of fastening members is provided for coupling the planar member to the support members. The substantially planar member includes apertures for receiving the support members. The support members are individually adjustable for adjusting the height and angle of the planar member with respect to the bottom surface of the boat.

19 Claims, 2 Drawing Sheets

ADJUSTABLE FOOT PEDESTAL FOR A TROLLING MOTOR CONTROLLER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

This invention relates in general to an adjustable foot pedestal, and more specifically, to a portable adjustable foot pedestal for use in fishing boat with a foot pedal trolling motor control.

2. Description of the Related Art

Boats utilized for fishing commonly include two sets of motors. A gasoline-operated motor (i.e., combustion motor) is typically mounted on the stern (rear) of the boat that is used to transport the passengers between a docking location and a fishing location. The second motor is an electric motor that is used for trolling the boat through the water. Typically, the electric motors are mounted on the bow (front) of the boat so as to slowly and calmly pull the boat through the water. Fishing lines are commonly cast in the water while the boat is trolling which requires a person fishing to not only concentrate on fishing but to operating and control the speed and steering of the boat. Some electric driven motors provide a handle coupled to the electric motor so that the person operating the boat may manually steer the boat between various fishing locations. However, this hinders the operator's ability to use both hands for fishing while maneuvering the boat.

Another type of control mechanism for controlling the steering and speed of the boat utilizes a foot pedal controller. The foot pedal controller allows the operator of the boat to utilize both hands for fishing while steering and controlling the speed of the boat by the operation of foot controls. The foot controller may be a fixed or portable device that is connected to the electric motor by cables or electric cords. The foot pedal controller includes one or more piviotable foot pedals that are operated by the toe portion and the heel portion of the operator's foot. The foot pedal controller is typically disposed flat on the bottom surface of the boat or has been mounted on a fixed angled pedestal stand.

An adjustable fishing seat is commonly used to increase or decrease the height of the seat so as to assist the operator in reaching the controller. Operating a foot pedal controller on a flat surface or at a fixed incline, however, is undesirable to the operator since the awkward position may cause undue strain or discomfort to the operator. Furthermore, operators with leg handicaps may find difficulty in reaching or operating the controller on flat surfaces or on fixed inclines.

Systems are known to provide a seating platform which includes a mounted chair and a mounted foot stand which cooperate to adjust to a individual's overall height. Although these systems are adjustable in height, the angle of the foot stand is fixed which does not allow the operator to adjust to a desired angle of inclination. Other systems include a foot pedal controller integrated within the platform foot pedal stand. Although some systems allow for horizontal movement of the integrated foot controller pedal/stand which take into consideration the operators leg length combined with the adjustment of the chair places the operator in a more comfortable operating position. However these systems are single-piece units which are expensive and not portable between different boats. Not only are such systems fixed to a single boat, but also they are fixed within a single location of the boat.

SUMMARY OF THE INVENTION

The present invention has the advantage of providing a portable foot pedestal for supporting a foot pedal controller that controls an electric motor for trolling a boat. The portable foot pedestal is adjustable to a desired height and angle of inclination for alleviating undue strain and discomfort for an operator operating the foot pedal controller.

In one aspect of the present invention, a portable adjustable foot pedestal is provided for supporting a foot switch trolling motor controller for a boat. The portable foot pedestal includes a substantially planar member having an upper surface and a bottom surface for supporting the foot switch controller. A plurality of adjustable support members is provided for supporting the planar member. The support members include substantially spherical end portions for contacting a bottom surface of the boat. A plurality of fastening members is provided for coupling the planar member to the support members. The substantially planar member includes apertures for receiving the support members. The support members are individually adjustable for adjusting the height and angle of the planar member with respect to the bottom surface of the boat.

DETAILED DESCRIPTION OF PREFERRED EMBODIMENTS

Figure 1:
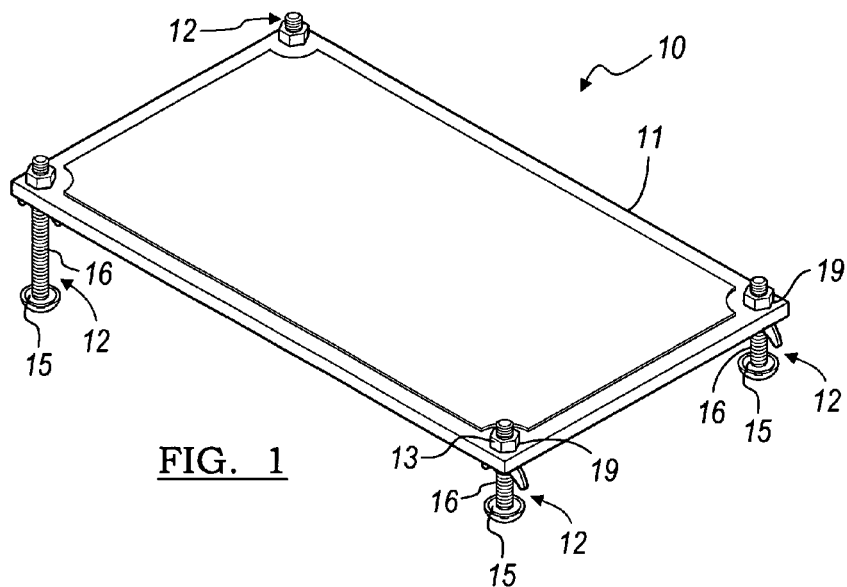
FIG. 1 is a perspective view of an adjustable foot pedestal according to a first preferred embodiment of the present invention.
Figure 2:
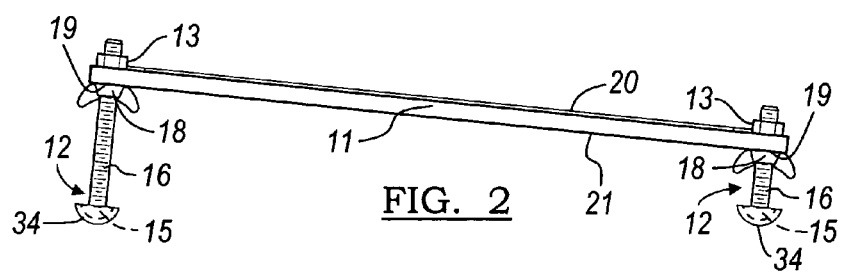
FIG. 2 is a side view of the adjustable foot pedestal according to a first preferred embodiment of the present invention.

Referring now to Drawings, there is shown in FIG. 1 and FIG. 2 an illustration of a portable and adjustable foot pedestal 10 according to a preferred embodiment. The adjustable foot pedestal 10 includes a substantially planar support member 11 and a plurality of adjustable support members 12. In the preferred embodiment the planar member 11 is rectangular shaped having a first side surface 20 (i.e., upper surface) and a second side surface 21 (i.e., bottom surface), although any other suitable shape may be used. The planar member 10 is preferably made of aluminum, however, in alternative embodiments the planar member 11 may be made of other non-corrosive metals or alloys, plastics, glass, fiberglass, or weather treated material such as painted wood so as to withstand exposure to water. The planar member 11 supports a foot switch (pedal) controller (shown in FIG. 4 and FIG. 5) as well as a force applied from an operator's foot to the foot pedal controller. The planar member 11 includes a plurality of apertures 19 located at each corner of the planar member 11. The plurality of apertures 19 extends from the upper surface 20 to the bottom surface 21 for receiving the adjustable support members 12.

The adjustable support members 12 include a main body portion 16 and an end portion 15. Preferably, the body portion 16 and the end portion 15 are integral, however, the body portion 16 and the end portion 15 may be separate components that are securely coupled to one another. The body portion 16 of each adjustable support member 12 is threaded, although only a predetermined length of the body portion 16 may require threads. The length of the threaded portion of each adjustable support member defines the predetermined range that the planar member 11 may be variably adjusted to. Each of the adjustable support members 12 is extendable through a respective aperture.

A first set of fasteners 18 is disposed on a bottom surface 21 of the planar member 11 and a second set of fasteners 13 is disposed on the top surface 20 of the planar member 11 for receiving and engaging the threaded surface of the body portion 16 of each adjustable support member. When the first set of fasteners 18 and the second set of fasteners 13 are tightened against the bottom surface 21 and the upper surface 20, respectively, the planar member 11 becomes secured to the adjustable fastening members 12. Washers may be disposed between each respective fastener and a respective surface of the planar member 11. Each respective adjustable support member may be secured to planar member 11 at a respective height to achieve a respective desired height and angle of incline of the support member 11. In the preferred embodiment, the first set of fasteners 18 include wing nuts. Wing nuts allow for fast release and fastening to the planar member 11 without the use of any additional accessories or tools. The first set of fasteners 18, second set of fasteners 13, and the adjustable support members 12 may be made from a non-corrosive material such as stainless steel, or may be coated with rust resistance material such as zinc for corrosion prevention. Alternatively, other types of rust prevention coatings and processes (e.g., galvanization) may be used for preventing corrosion.

Each of the adjustable support members 12 is individually adjustable for supporting the planar member 11. The plurality of fasteners are loosened and tightened to increase/decrease/maintain the height of each respective support member as well as to adjust the inclination of the support member 11 with respect to a bottom surface of the boat. Since each operator may have preferential foot position for operating the foot pedal controller at a desired incline and height, the foot pedestal 10 may be variably adjusted to a desired incline angle and height for alleviating any undue stain or discomfort to the operator. By adjusting a respective front set of adjustable support members and a respective rear set of adjustable support members, the angle of inclination and can be variably set to an operators preferred position of operation. In addition to setting the planar member 11 at a specific angle of incline, the planar member 11 can be adjusted to a predetermined overall height with respect to the bottom surface of the boat while maintaining the specific angle of inclination. For example, an operator of the boat setting the planar member to a desired angle of inclination (e.g., 30 degrees) can maintain this incline while increasing or decreasing the overall height of the inclined planar member with respect to the bottom surface of the boat. In addition, longer length adjustable support members may be substituted to allow greater overall height or increase the angle of inclination. The adjustable support members may also be substituted with smaller length adjustable support members to minimize interference conditions or obstructions between the operator's foot or leg and a respective adjustable support member extending above the top surface 21 of the planar support member 11.

The end portions 15 of the adjustable support members 12 have bottom surfaces that are substantially spherical and therefore result in the same profile of a surface area of each end portion being in contact the bottom surface of the boat regardless of the angle of inclination of the planar member 11. Consequently, each adjustable support member will have a substantially same frictional contact area for each end portion for any respective angle of inclination between the planar member 11 and the bottom surface of the boat.

In the preferred embodiment, the adjustable support members 12 are produced from a metallic material. However, in other preferred embodiments, the adjustable support members 12 may be produced from a non-metallic material having comparable strength properties for supporting the planar member 11 and any respective forces exerted on the adjustable support members 12. Since the bottom surface of the boat and the end portions 15 of the adjustable support members 12 are preferably produced from metallic materials, frictional forces between the two metallic surfaces in addition to the possibility for a layer of water to be disposed between the two metallic surfaces may result in a low coefficient of friction between the two mating surface areas resulting in slippage of the foot pedestal 10. To increase the coefficient of friction between the two contacting surfaces, an overlaying material 34 such as a frictional coating may be applied to the end portions 15 thereby increasing the coefficient of friction between the two mating contact surfaces. The frictional coating may be a spray-on coating or a dipped coating. It should be shown that various materials and processes may be used to apply the frictional coating to the end surface. In other preferred embodiments, the overlaying structure 34 may include a cover. The cover having a higher coefficient of friction than the material composition of the end portions 15 may be disposed over the end portions 15 to provide increased friction forces between the two contacting surface areas. The cover may include a boot or cap that is self retaining on the end portions 15.

Figure 3:
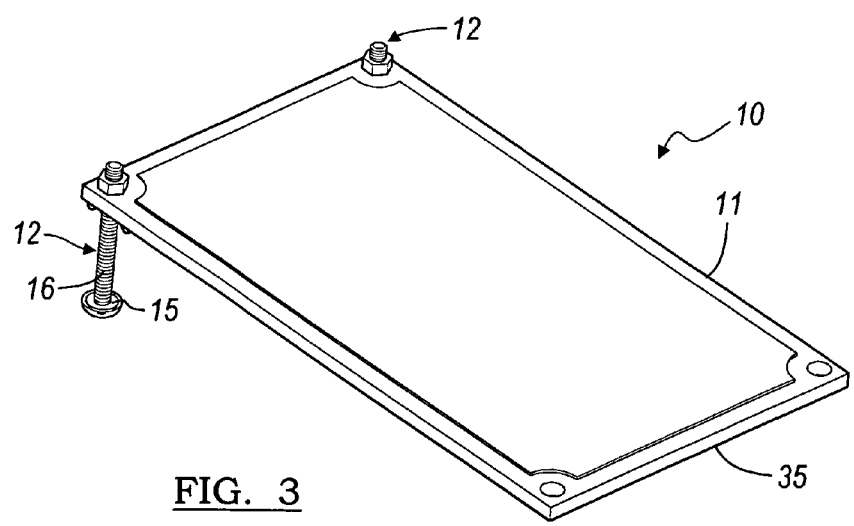
FIG. 3 is a perspective view of an adjustable foot pedestal according to a second preferred embodiment of the present invention.

FIG. 3 illustrates another preferred embodiment where only a respective rear set of adjustable support members is used for supporting the planar member 11. A front portion 35 of the support member 11 contacts the bottom surface of the boat and by adjusting the respective rear set of adjustable support members adjusts the angle of incline. In yet other preferred embodiments, additional adjustable support members as well as different aperture locations may be utilized.

Figure 4:
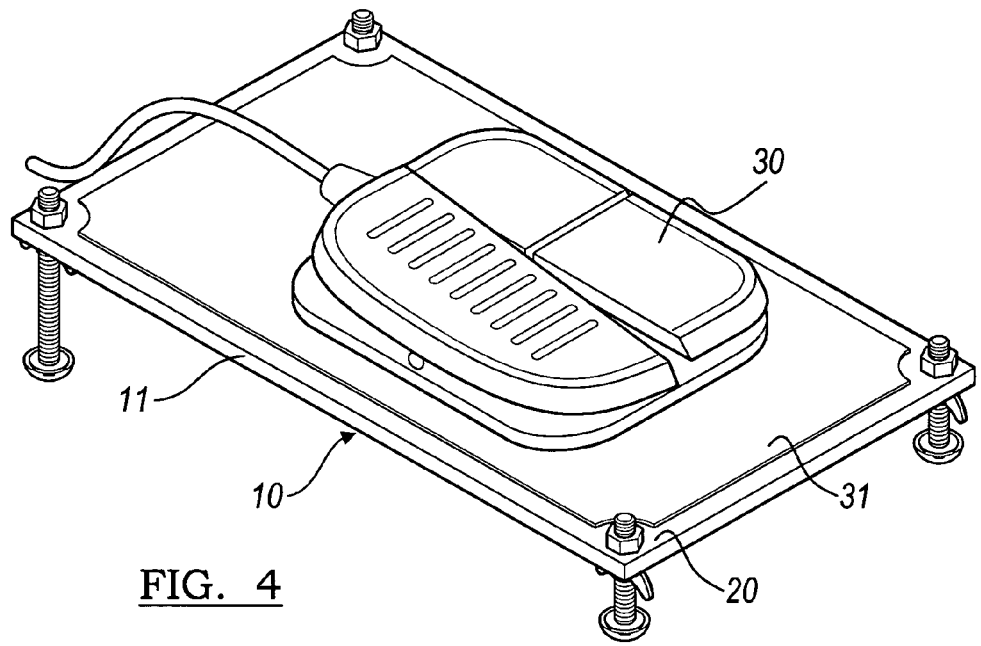
FIG. 4 illustrates a perspective view of the adjustable foot pedestal retaining a foot pedal controller at an inclined angle according to a first preferred embodiment of the present invention.

Since the planar member 11 may be positioned at a varying elevated angles of inclination dependent upon the operator's desired mode of operation, slippage between the foot pedal controller and the upper surface 20 may occur especially at higher angles of incline. FIG. 4 illustrates the foot pedal controller 30 disposed on the adjustable foot pedestal 10 positioned at a respective angle to the bottom surface of the boat. To minimize the potential for the foot pedal controller to slip on the upper surface 20, a frictional material 31 is disposed on the upper surface 20 of the planar member 11. In the preferred embodiment, the frictional material 31 may be a spray-on coating such as vulcanized rubber. The spray-on coating is sprayed on in a liquid form and adheres to the upper surface 20 as the liquid solidifies. In other preferred embodiments, the frictional member may include a pliable material sheet, such as a rubberized mat. The rubberized mat may be adhered to the upper surface 20 using an epoxy, preferably a waterproof epoxy.

Figure 5:
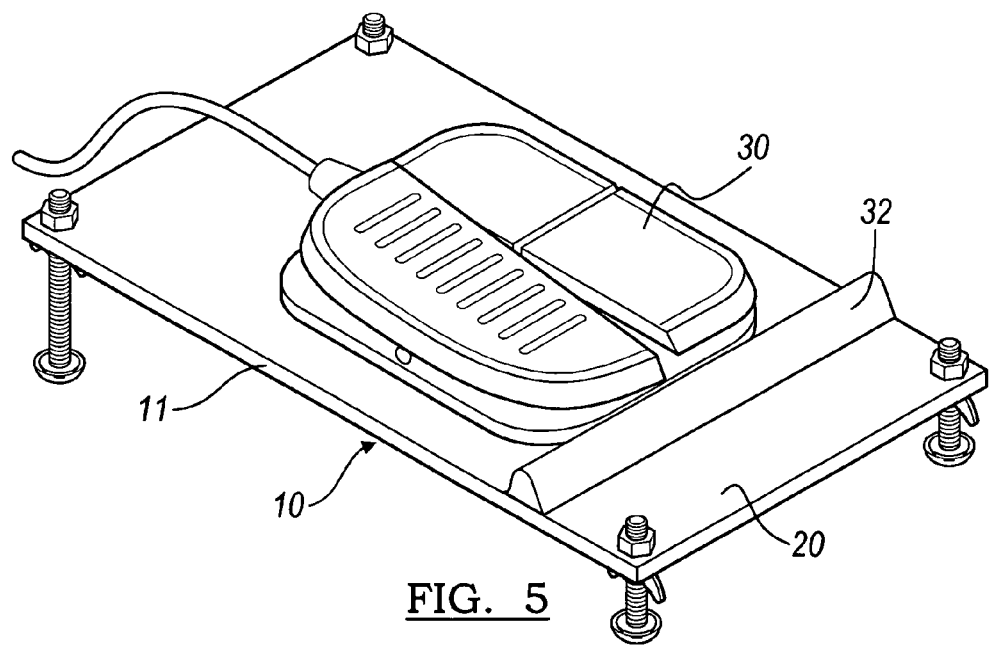
FIG. 5 illustrates a perspective view of a an adjustable foot pedestal retaining a foot pedal controller at an inclined angle according to a third preferred embodiment of the present invention.

FIG. 5 illustrates another preferred embodiment of retaining the foot pedal controller on the upper surface 20 of the planar member 12. The planar member 11 includes a lateral cross member 32 disposed along a lower portion of the planar member 11. The lateral cross member 32 is a raised ledge which creates an abutment surface for preventing the foot pedal controller 30 from sliding down the upper surface 20 while the planar member 11 is positioned at elevated incline angles. The lateral cross member 32 may be integrally formed as part of the planar member 11 or may be a separate component affixed to the planar member 11. In addition, the lateral cross member 32 may extend to a respective height above the planar member 11 to angularly support an operator's foot in addition to the foot pedal controller 30.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A portable adjustable foot pedestal for supporting a foot switch trolling motor controller for a boat, the apparatus comprising:
   a substantially planar member having an upper surface and a bottom surface for supporting said foot switch controller;
   a plurality of adjustable support members for supporting said planar member, said support members include substantially spherical end portions for contacting a bottom surface of said boat; and
   a plurality of fastening members for coupling said planar member to said support members;
   wherein said substantially planar member includes apertures for receiving said support members, said support members are individually adjustable for adjusting said height and angle of said planar member with respect to said bottom surface of said boat.

2. The portable foot pedestal of claim 1 further comprising a frictional member disposed on said upper surface of said substantially planar member for applying a friction to said foot switch controller.

3. The portable foot pedestal of claim 2 wherein said frictional member includes a rubberized sheet.

4. The portable foot pedestal of claim 2 wherein said frictional member includes a rubberized spray-on coating.

5. The portable foot pedestal of claim 1 wherein said planar surface further comprises a lateral cross member for preventing said foot switch controller from sliding off said planar member when said planar member is at an incline with respect to said bottom surface of said boat.

6. The portable foot pedestal of claim 1 wherein said plurality of support members are threaded for engaging said fastening members, said threaded support members allow said planar member to be variably adjustable within a predetermined range.

7. The portable foot pedestal of claim 1 wherein a first set of fastening members are disposed on said bottom surface of said substantially planar member and a set of second fastening members are disposed on said upper surface of said substantially planar member for engaging said adjustable support members and for securing said substantially planar member at a respective height and angle to said bottom surface of said boat.

8. The portable foot pedestal of claim 1 wherein at least one set of fastening members includes wingnuts.

9. The portable foot pedestal of claim 1 wherein said spherical end portions include a frictional coating for increasing a coefficient of friction between said end portions and said bottom surface of said boat.

10. The portable foot pedestal of claim 1 wherein said circular end portions include a cover structure for frictionally engaging said end portions with said bottom surface of said boat.

11. The portable foot pedestal of claim 10 wherein said cover structure includes a cap.

12. The portable foot pedestal of claim 10 wherein said cover structure includes a boot.

13. A method of adjusting a planar member of a portable foot switch pedestal to a desired height and angle, said method comprising the steps of:
   providing a planar member for supporting said foot switch pedestal;
   providing a plurality of adjustable support members for supporting said planar member;
   providing a first set of fasteners and a second set of fasteners for securing said planar member to adjustable support members;
   loosening said first and second set of fasteners for adjusting said planar member to a desired height and angle of inclination;
   tightening said first and second set of fasteners against said planar member for securing said planar member to said adjustable support members.

14. The method of claim 13 further comprising the step of applying a frictional member to an upper surface of said planar member for increasing a coefficient of friction between said planar member and said foot switch pedestal.

15. The method of claim 14 wherein said step of applying said frictional member includes applying a spray-on coating.

16. The method of claim 14 wherein said step of applying said friction member disposing a rubberized sheet on said upper surface of said planar member.

17. The method of claim 13 further comprising the step of applying a frictional member to an end portion of said adjustable support members.

18. The method of claim 17 wherein said step of applying said frictional member to said end portion includes applying a rubberized spray-on coating to said end portions.

19. The method of claim 17 wherein said step of applying said frictional member to said end portion includes applying a cover structure over said end portions.

* * * * *